United States Patent Office.

J. AUSTIN HEWETT, OF NORA SPRINGS, IOWA.

Letters Patent No. 110,463, dated December 27, 1870.

IMPROVEMENT IN COMPOUNDS AND PROCESSES OF REMOVING INCRUSTATIONS OF LIME FROM STEAM-BOILERS, METALS, &c.

The Schedule referred to in these Letters Patent and making part of the same.

I, J. AUSTIN HEWETT, of Nora Springs, in the county of Floyd and State of Iowa, have invented a certain Chemical Compound and Process for Dissolving Lime and for Cleansing Steam-Boilers, Metals, Mechanical Instruments, and all other kinds and descriptions of machinery whatever, from the deposits of lime and from all corroding and impure substances which exist and may be found in water, either hard or soft, fresh or salt, separately or combined, with safety and without injury to the materials of which they or either of them may be composed, and of which the following is a specification.

Take as a basis for operation a steam-boiler of the capacity of twenty-five-horse power, put into the boiler one gauge of water and ten pounds of sal-soda to cleanse the water, and after they have remained together in the boiler thirty minutes put into the boiler five pounds of muriatic acid, which will in twenty minutes completely dissolve all the lime and other impure substances reached by the compound used. Then put into the boiler one and one-half gallon of simple sirup and the same quantity of kerosene oil, which, by the rising of gases resulting therefrom, will, within twenty minutes, dissolve into a complete and perfect solution all of the particles and deposits of lime and other impure substances which had not been reached by the ingredients previously used.

Then, to neutralize the acid and give to the boiler a finished and perfect condition, and to fill all orifices caused by the removal of the lime and other corroding substances, pour into the boiler one gallon of linseed-oil in a raw state, together with five pounds of pure starch. Then raise the steam in the boiler to twenty-five pounds' pressure and continue that pressure for twenty minutes; then raise the steam-balances so as to allow a rapid escape of steam from the boiler, and at the same time open the blow-off cock, from which the water, the compound, and impurities may escape.

The dissolved lime, with all other impurities and corroding substances in the boiler will then either be ejected or found settled at the bottom of the boiler, and its entire inner surface, together with its flues and flue-plates, will be completely cleansed.

To cleanse boilers of larger or smaller dimensions than those of a twenty-five-horse power, use in the same manner the same ingredients in proportion to the capacities of each as compared to one of twenty-five-horse power.

This compound and process may be safely and successfully applied without injury to the boiler, whether the machinery attached be in motion or otherwise, and when put in water at the temperature above indicated, and in proportion to the surface of the instrument, implement, metal, or machinery sought to be cleansed, it will remove all lime, rust, and other corroding substances without the least injury to any of the materials of which they are composed.

Claim.

I claim as my invention—

The compound and process for dissolving lime and for cleansing steam-boilers, metals, mechanical instruments, and all kinds and descriptions of machinery whatever from the deposits of lime and from all corroding and impure substances which exist or may be found in water, either hard or soft, fresh or salt, separately or combined, with safety and without injury to the materials of which they are composed, substantially as described.

J. AUSTIN HEWETT.

Witnesses:
SIDNEY THOMAS,
WM. B. ALLISON.